(12) United States Patent
Wada

(10) Patent No.: US 12,531,281 B2
(45) Date of Patent: Jan. 20, 2026

(54) ENERGY STORAGE APPARATUS

(71) Applicant: GS Yuasa International Ltd., Kyoto (JP)

(72) Inventor: Akira Wada, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 642 days.

(21) Appl. No.: 17/642,056

(22) PCT Filed: Sep. 8, 2020

(86) PCT No.: PCT/JP2020/033848
§ 371 (c)(1),
(2) Date: Mar. 10, 2022

(87) PCT Pub. No.: WO2021/059948
PCT Pub. Date: Apr. 1, 2021

(65) Prior Publication Data
US 2022/0407123 A1 Dec. 22, 2022

(30) Foreign Application Priority Data
Sep. 24, 2019 (JP) ................................ 2019-172668

(51) Int. Cl.
*H01M 10/42* (2006.01)
*H01M 50/505* (2021.01)

(52) U.S. Cl.
CPC ..... *H01M 10/4257* (2013.01); *H01M 50/505* (2021.01); *H01M 2220/20* (2013.01)

(58) Field of Classification Search
None
See application file for complete search history.

(56) References Cited

U.S. PATENT DOCUMENTS

| | | |
|---|---|---|
| 2001/0014014 A1 | 8/2001 | Hiramatsu |
| 2005/0020106 A1 | 1/2005 | Ito |
| 2008/0254654 A1 | 10/2008 | Ito |
| 2010/0052692 A1 | 3/2010 | Yano et al. |
| 2010/0124693 A1* | 5/2010 | Kosugi ............... H01M 50/516 429/92 |

(Continued)

FOREIGN PATENT DOCUMENTS

| | | |
|---|---|---|
| CN | 107403889 A | 11/2017 |
| JP | 2001-230555 A | 8/2001 |
| JP | 2005-045867 A | 2/2005 |

(Continued)

OTHER PUBLICATIONS

International Search Report (ISR) (PCT Form PCT/ISA/210), in PCT/JP2020/033848, dated Nov. 10, 2020.

*Primary Examiner* — Alix E Eggerding
(74) *Attorney, Agent, or Firm* — McGinn I.P.Law Group, PLLC

(57) ABSTRACT

An energy storage apparatus includes: an energy storage device; a substrate in which a through hole penetrating a main surface is formed; a through member that penetrates the through hole; and a lateral member disposed lateral to the substrate and covering a side surface of the substrate. The lateral member includes an opening through which at least one of two portions of the through member, the two portions sandwiching the through hole, is visually recognizable from the outside.

20 Claims, 7 Drawing Sheets

(56) References Cited

U.S. PATENT DOCUMENTS

2014/0299373 A1\* 10/2014 Nakamura .......... H01M 50/507
174/74 R
2019/0135207 A1  5/2019 Sumida

FOREIGN PATENT DOCUMENTS

| JP | 2008-193773 A | 8/2008 | | |
|---|---|---|---|---|
| JP | 2010-056035 A | 3/2010 | | |
| JP | 2012-125120 A | 6/2012 | | |
| JP | 2013-080569 A | 5/2013 | | |
| JP | 2013-080620 A | 5/2013 | | |
| JP | 2013-109927 A | 6/2013 | | |
| JP | 2013-165067 A | 8/2013 | | |
| JP | 2016-018740 A | 2/2016 | | |
| JP | 2017-050140 A | 3/2017 | | |
| JP | 2017-059376 A | 3/2017 | | |
| JP | 2017-068989 A | 4/2017 | | |
| JP | 2018026322 A | \* | 2/2018 | ............. H01G 9/008 |
| JP | 2018-101502 A | 6/2018 | | |
| JP | 2019-197665 A | 11/2019 | | |
| WO | WO 2018/008478 A1 | 1/2018 | | |

\* cited by examiner

ENERGY STORAGE APPARATUS

TECHNICAL FIELD

The present invention relates to an energy storage apparatus including an energy storage device and a substrate.

BACKGROUND ART

Conventionally, an energy storage apparatus including an energy storage device and a substrate is widely known. Patent Document 1 discloses a vehicle battery system (energy storage apparatus) including a battery block made up of a plurality of battery cells (energy storage devices) and a circuit board (substrate) that detects a state of each battery cell, with the circuit board fixed to the battery block.

PRIOR ART DOCUMENTS

Patent Document

Patent Document 1: JP-A-2010-56035

SUMMARY OF THE INVENTION

Problems to be Solved by the Invention

In the energy storage apparatus, a member (hereinafter referred to as a lateral member) may be disposed lateral to the substrate. In such a case, there is a possibility that the state of penetration of the through member into the substrate cannot be grasped. When the state of penetration of the through member into the substrate cannot be grasped, there is a possibility that a defect due to attachment failure or the like of the through member to the substrate occurs.

An object of the present invention is to provide an energy storage apparatus in which a state of penetration of a through member into a substrate can be easily grasped.

Means for Solving the Problems

An energy storage apparatus according to one aspect of the present invention includes: an energy storage device; a substrate in which a through hole penetrating a main surface is formed; a through member that penetrates the through hole; and a lateral member disposed lateral to the substrate and covering a side surface of the substrate. The lateral member includes an opening through which at least one of two portions of the through member, the two portions sandwiching the through hole, is visually recognizable from an outside.

The present invention can be realized not only as such an energy storage apparatus but also as a lateral member including the opening and can also be realized as a lateral member, a substrate, and a through member.

Advantages of the Invention

According to the energy storage apparatus of the present invention, the state of penetration of the through member into the substrate can be easily grasped.

MODE FOR CARRYING OUT THE INVENTION

Figure 1:
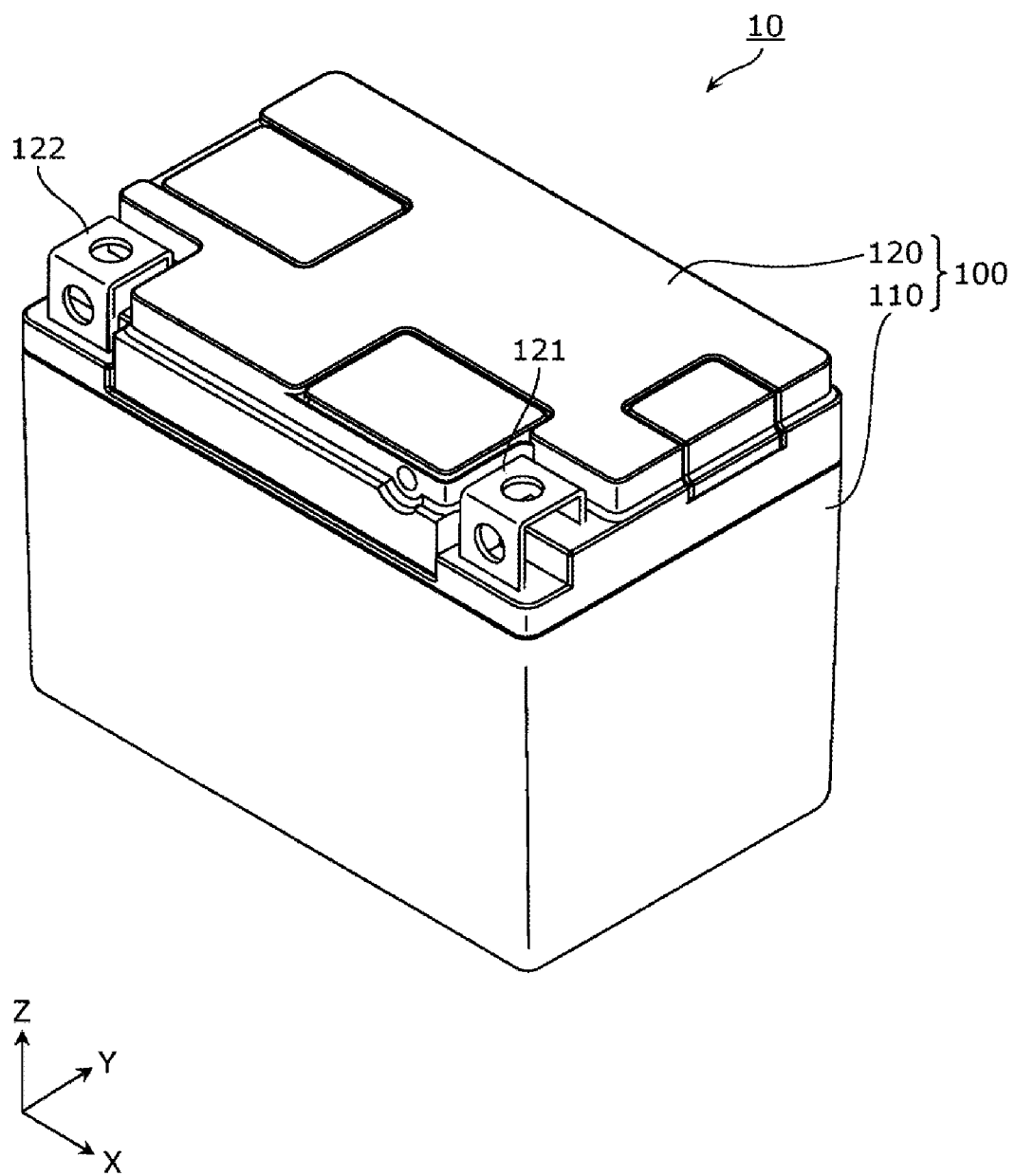
FIG. 1 is a perspective view illustrating an appearance of an energy storage apparatus according to an embodiment.

In Patent Document 1 described above, a voltage detection line (hereinafter referred to as a through member) connected to an electrode terminal of an energy storage device is fixed to a substrate in a state where the voltage detection line penetrates the through hole of the substrate (cf. FIG. 12 and the like of Patent Document 1). In the energy storage apparatus, various members are disposed in a small space in order to achieve space saving or the like, and thus, a member (hereinafter referred to as a lateral member) may be disposed lateral to the substrate. The inventor of the present application has found that in such a case, there is a possibility that the state of penetration of the through member into the substrate, such as whether the through member is reliably fixed to the substrate, cannot be grasped due to a difficulty in confirming the vicinity of the through hole of the substrate from the side of the substrate. When the state of penetration of the through member into the substrate cannot be grasped, there is a possibility that a defect due to attachment failure or the like of the through member to the substrate occurs.

The present invention has been made by the inventor of the present application focusing newly on the above problem, and an object of the present invention is to provide an energy storage apparatus in which a state of penetration of a through member into a substrate can be easily grasped.

An energy storage apparatus according to one aspect of the present invention includes: an energy storage device; a substrate in which a through hole penetrating a main surface is formed; a through member that penetrates the through hole; and a lateral member disposed lateral to the substrate and covering a side surface of the substrate. The lateral member includes an opening through which at least one of two portions of the through member, the two portions sandwiching the through hole, is visually recognizable from an outside.

According to this, in the energy storage apparatus, the lateral member disposed lateral to the substrate and covering the side surface of the substrate includes the opening through which at least one of two portions, sandwiching the through hole, in the through member that penetrates the through hole of the substrate is visually recognizable from the outside. In this manner, the opening is formed in the lateral member, and at least one of the two portions of the through member sandwiching the through hole of the substrate is made visually recognizable from the outside. Thereby, the portion penetrating the through hole of the through member is visually recognizable from the outside of the lateral member through the opening, so that the state of penetration of the through member into the substrate can be easily grasped.

The opening may be formed such that a portion closer to the energy storage device out of the two portions is visually recognizable.

According to this, the opening of the lateral member is formed such that the portion closer to the energy storage device out of the two portions sandwiching the through hole in the through member can be visually recognized. In the through member, the portion closer to the energy storage device out of the two portions sandwiching the through hole is located inside the energy storage apparatus, and it is thus difficult to grasp the state of the through member. Accordingly, an opening is formed in the lateral member such that the portion closer to the energy storage device can be visually recognized. As a result, the portion of the through member closer to the energy storage device, the portion being in a state of penetration difficult to grasp, is visually recognizable from the outside of the lateral member through the opening, so that the state of penetration of the through member can be easily grasped.

The through member may be a busbar connected to the energy storage device, and the busbar may include a busbar body, and a protrusion that projects from the busbar body, penetrates the through hole, and is joined to the substrate, and the opening may be formed such that a joined state of the protrusion to the substrate is visually recognizable.

According to this, the through member is the busbar connected to the energy storage device, and the opening of the lateral member is formed such that the joining state of the protrusion, which penetrates the through hole of the busbar and is joined to the substrate, can be visually recognized. In order to measure the voltage of the energy storage device, a protrusion may be formed on the busbar, and the protrusion may be allowed to penetrate the through hole of the substrate and be joined (e.g., soldered) to the substrate. In this case, it is necessary to check whether the protrusion of the busbar is joined to the substrate (e.g., whether a solder fillet is formed favorably). Therefore, the opening is formed in the lateral member, and the joined state of the protrusion to the substrate can be visually recognized. As a result, the joined state of the protrusion of the busbar to the substrate can be easily grasped, so that it is possible to prevent stress concentration on the protrusion due to joint failure and to prevent the breakage of the protrusion.

The lateral member may be a busbar frame on which a busbar connected to the energy storage device is mounted, and the busbar frame may include a frame body, and a wall that projects from the frame body and covers a side surface of the substrate, and in which the opening is formed.

According to this, the lateral member is the busbar frame on which the busbar is placed, and the busbar frame includes the wall that covers the side surface of the substrate, and in which the opening is formed. In the energy storage apparatus, the busbar frame may be provided with a wall that covers the side surface of the substrate. For the purpose of preventing the movement (vibration) of the energy storage device in the outer case of the energy storage apparatus, or some other purpose, a wall may be provided on the busbar frame, and the wall may be engaged with the cover of the outer case to fix the busbar frame to the outer case. Alternatively, a wall may be provided on the busbar frame as a guide for disposing the cover on the outer case. In such a case, there is a possibility that the state of penetration of the through member into the substrate cannot be grasped due to the wall of the busbar frame. Therefore, the opening is formed in the wall of the busbar frame to make the state of penetration of the through member into the substrate visually recognizable. As a result, even if the wall is provided in the busbar frame, the state of penetration of the through member into the substrate can be easily grasped.

The opening may comprise a notch or a through hole formed in the lateral member.

According to this, since the opening of the lateral member is a notch or a through hole formed in the lateral member, by forming the notch or the through hole in the lateral member, it is possible to easily form the opening through which the state of penetration of the through member into the substrate can be visually recognized.

The through member may include a long side surface and a short side surface on a side surface in directions intersecting with a direction of penetration into the through hole, and the opening may be disposed to face the long side surface of the through member.

According to this, the opening of the lateral member is disposed to face the long side surface of the through member. As described above, by disposing the opening of the lateral member to face the long side surface of the through member instead of the short side surface thereof, it is possible to visually recognize the long side surface side of the through member instead of the short side surface thereof. This makes it easy to visually recognize the state of penetration of the through member, so that the state of penetration of the through member into the substrate can be easily and more reliably grasped.

Hereinafter, an energy storage apparatus according to an embodiment of the present invention (including a modification thereof) will be described with reference to the drawings. An embodiment described below illustrates a comprehensive or specific example. Numeral values, shapes, materials, components, placement positions and connection forms of the components, manufacturing steps, a sequence of the manufacturing steps, and the like shown in the following embodiment are only examples and are not intended to limit the present invention. In the drawings, dimensions and the like are not illustrated strictly. In the drawings, the same or similar components are denoted by the same reference numerals.

In the following description and drawings, a direction in which a pair of (positive-electrode-side and negative-electrode-side) electrode terminals are disposed in one energy storage device or a direction in which the short side surface of a case of the energy storage device faces is defined as an X-axis direction. A direction in which the energy storage devices are arranged or a direction in which the long side surface of the case of the energy storage device is defined as a Y-axis direction. A direction in which the body and the lid of the outer case of the energy storage apparatus are disposed, a direction in which the energy storage devices, the busbar frame, the busbar, and the substrate are disposed, or a vertical direction is defined as a Z-axis direction. The X-axis direction, the Y-axis direction, and the Z-axis direction are mutually intersecting (orthogonal in the present embodiment) directions. It is conceivable that the Z-axis direction may not be the vertical direction depending on the use aspect, but for convenience of description, a description will be given below with the Z-axis direction as the vertical direction.

In the following description, an X-axis plus direction indicates an arrow direction of the X-axis, and an X-axis minus direction indicates a direction opposite to the X-axis plus direction. The same applies to the Y-axis direction and the Z-axis direction. Expressions indicating relative directions or postures, such as parallel and orthogonal, strictly include cases where the directions or postures are not the same. Two directions being orthogonal to each other not only means that the two directions are completely orthogonal to each other, but also means that the two directions are substantially orthogonal to each other, the two directions being orthogonal includes a difference of about several percent.

EMBODIMENT

1 General Description of Energy Storage Apparatus 10

Figure 2:
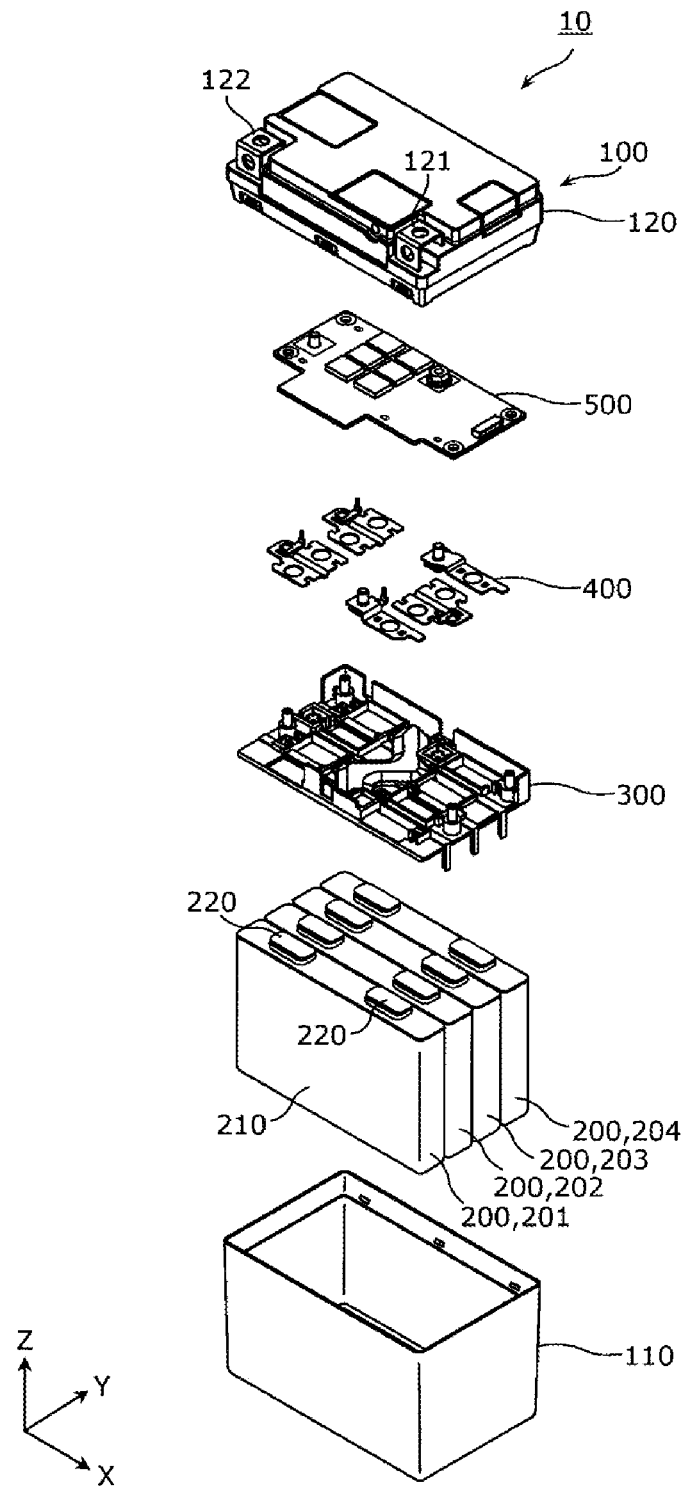
FIG. 2 is an exploded perspective view illustrating each component when the energy storage apparatus according to the embodiment is disassembled.

First, an energy storage apparatus 10 according to the present embodiment will be generally described. FIG. 1 is a perspective view illustrating the appearance of the energy storage apparatus 10 according to the present embodiment. FIG. 2 is an exploded perspective view illustrating each component when the energy storage apparatus 10 according to the present embodiment is disassembled.

The energy storage apparatus 10 is an apparatus capable of charging electricity from the outside and discharging electricity to the outside and has a substantially rectangular parallelepiped shape in the present embodiment. The energy storage apparatus 10 is a battery module (assembled battery) used for power storage application, power supply application, or the like. Specifically, the energy storage apparatus 10 is used as a battery or the like for driving or starting an engine of a moving body such as an automobile, a motorcycle, a watercraft, a ship, a snowmobile, an agricultural machine, a construction machine, or a railway vehicle for electric railways. Examples of the automobile include an electric vehicle (EV), a hybrid electric vehicle (HEV), a plug-in hybrid electric vehicle (PHEV), and a gasoline vehicle. Examples of the railway vehicle for electric railways include a train, a monorail, and a linear motor car. The energy storage apparatus 10 can also be used as a stationary battery or the like used for home use, a generator, or the like.

As illustrated in FIG. 1, the energy storage apparatus 10 includes an outer case 100, and as illustrated in FIG. 2, a plurality of energy storage devices 200, a busbar frame 300, a busbar 400, a substrate 500, and the like are housed inside the outer case 100. The energy storage apparatus 10 may include a spacer disposed between the plurality of energy storage devices 200, a binding member (side plate, end plate, etc.) binding the plurality of energy storage devices 200, and the like.

The outer case 100 is a case (module case) having a box shape (substantially rectangular parallelepiped shape) which forms an outer case of the energy storage apparatus 10. That is, the outer case 100 is disposed outside the plurality of energy storage devices 200, the busbar frame 300, the busbar 400, the substrate 500, and the like, and fixes the energy storage devices 200 and the like at predetermined positions for protection from an impact or the like. The outer case 100 is formed of, for example, an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyethersulfone (PES), an acrylonitrile butadiene styrene (ABS) resin, or a composite material thereof, or an insulation-coated metal. Thereby, the outer case 100 prevents the energy storage devices 200 and the like from coming into contact with an external metal member or the like. The outer case 100 may be formed of a conductive member such as metal so long as the electric insulation properties of the energy storage device 200 and the like are maintained.

The outer case 100 includes an outer case body 110 constituting the body of the outer case 100 and an outer case lid 120 constituting the lid of the outer case 100. The outer case body 110 is a bottomed rectangular cylindrical housing (casing) in which an opening is formed, and houses the energy storage devices 200 and the like therein. The outer case lid 120 is a flat rectangular member that closes the opening of the outer case body 110. The outer case lid 120 is engaged with or fitted to the outer case body 110 and is joined to the outer case body 110 by an adhesive, heat sealing, ultrasonic welding, or the like. The outer case lid 120 is provided with a positive external terminal 121 and a negative external terminal 122. The energy storage apparatus 10 charges electricity from the outside and discharges electricity to the outside through the positive external terminal 121 and the negative external terminal 122.

The energy storage device 200 is a secondary battery (battery cell) capable of charging and discharging electricity and is specifically a nonaqueous electrolyte secondary battery such as a lithium ion secondary battery. The energy storage device 200 has a flat rectangular parallelepiped shape (prismatic shape), and in the present embodiment, four energy storage devices 200 (energy storage devices 201 to 204) are arranged side by side in the Y-axis direction. The shape, number, arrangement position, and the like of the energy storage device 200 are not particularly limited. The energy storage device 200 is not limited to the nonaqueous electrolyte secondary battery but may be a secondary battery except for the nonaqueous electrolyte secondary battery or may be a capacitor. The energy storage device 200 may be not a secondary battery but a primary battery that can use stored electricity without being charged by a user. The energy storage device 200 may be a battery using a solid electrolyte. The energy storage device 200 may be a laminate-type energy storage device.

Specifically, the energy storage device 200 includes a case 210 and a pair of (positive-electrode-side and negative-electrode-side) electrode terminals 220. An electrode assembly, a pair of current collectors, an electrolyte solution (nonaqueous electrolyte), and the like are accommodated in the case 210, but illustration thereof is omitted. The case 210 is a rectangular parallelepiped (prismatic) case and is formed of a metal such as stainless steel, aluminum, an aluminum alloy, iron, or a plated steel plate. The electrode terminals 220 are terminals (a positive terminal and a negative terminal) electrically connected to the positive electrode plate and the negative electrode plate of the electrode assembly via the current collector and are made of aluminum, an aluminum alloy, copper, a copper alloy, or the like.

The electrode assembly is an energy storage element (power generating element) formed by stacking a positive electrode plate, a negative electrode plate, and a separator. The positive electrode plate is obtained by forming a positive active material layer on a positive electrode substrate layer that is a current collecting foil made of a metal such as aluminum or an aluminum alloy. The negative electrode plate is obtained by forming a negative active material layer on a negative electrode substrate layer that is a current collecting foil made of a metal such as copper or a copper alloy. As an active material used for each of the positive active material layer and the negative active material layer, a known material can be appropriately used so long as the material can occlude and release lithium ions. The electrode assembly may be an electrode assembly in any form such as a winding-type electrode assembly formed by winding plates (a positive electrode plate and a negative electrode plate), a layering-type (stacking-type) electrode assembly formed by layering a plurality of plate-shaped electrode plates, or a bellows-type electrode assembly formed by folding plates in a bellows shape.

The current collector is a member having conductivity and rigidity (a positive electrode current collector and a negative electrode current collector) electrically connected to the electrode terminal 220 and the electrode assembly. The positive electrode current collector is formed of aluminum, an aluminum alloy, or the like, similarly to the positive electrode substrate layer of the positive electrode plate, and the negative electrode current collector is formed of copper, a copper alloy, or the like, similarly to the negative electrode substrate layer of the negative electrode plate. The type of the electrolyte solution is not particularly limited so long as the electrolyte solution does not impair the performance of the energy storage device 200, and various electrolyte solutions can be selected.

The busbar frame 300 is a flat rectangular member capable of electrically insulating the busbar 400 from other members and regulating the positions of the busbars 400. The busbar frame 300 is formed of an insulating member such as PC, PP, or PE, which is similar to the outer case 100. Specifically, the busbar frame 300 is placed above the plurality of energy storage devices 200 and is positioned with respect to the plurality of energy storage devices 200. The busbar 400 is placed and positioned on the busbar frame 300. Thereby, the busbar 400 is positioned with respect to the plurality of energy storage devices 200 and are joined to the electrode terminals 220 included in the plurality of energy storage devices 200 (cf. FIG. 4).

Figure 5:
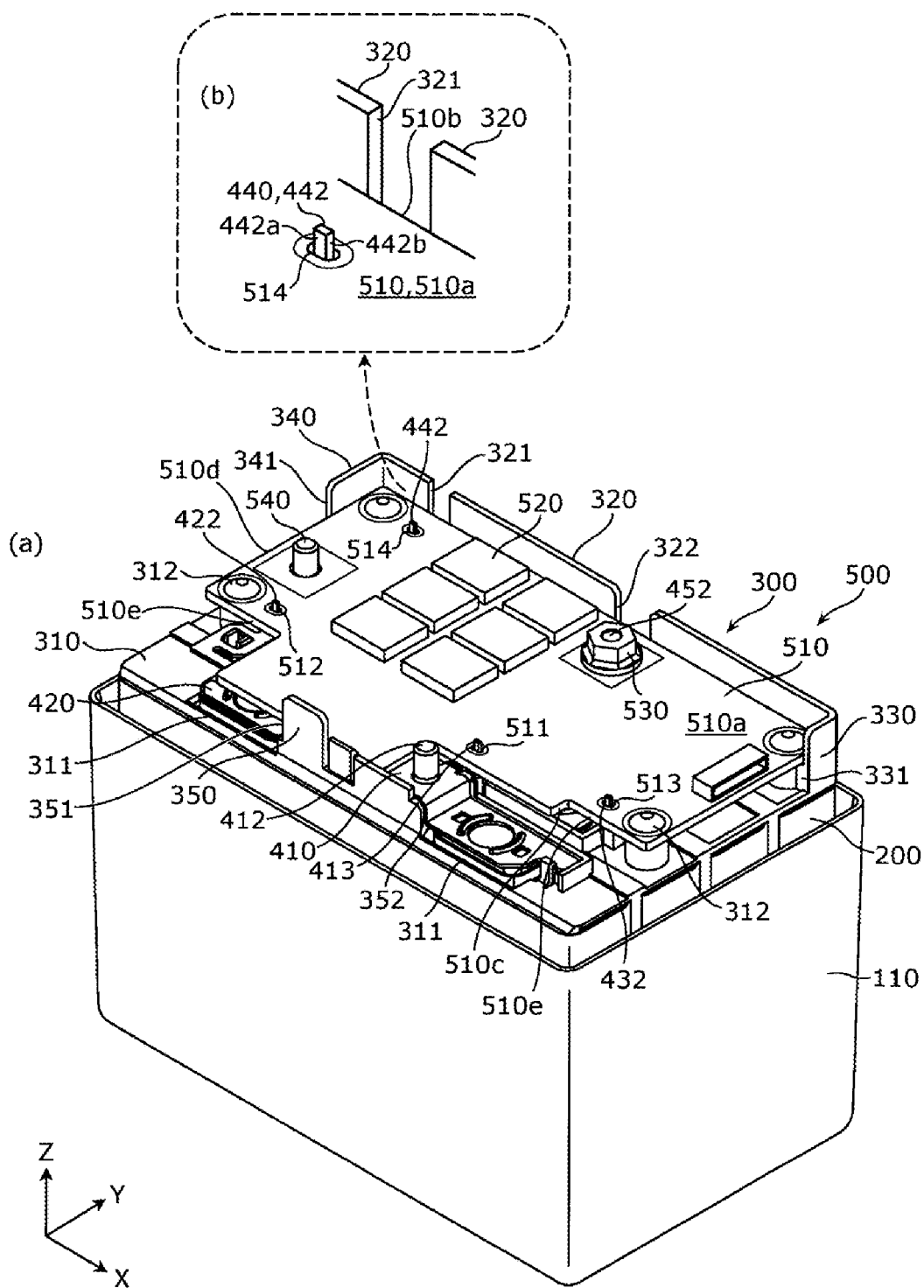
FIG. 5 is a perspective view illustrating a configuration in a state where the substrate is fixed to the busbar frame according to the embodiment.

After the joining of the busbar 400 to the electrode terminals 220 of the energy storage devices 200, the substrate 500 is mounted and fixed on the busbar frame 300 (cf. FIG. 5). As described above, the busbar frame 300 also has a function of mounting and fixing the substrate 500. The busbar frame 300 has a function of reinforcing the outer case 100 as the inner lid of the outer case 100, and a function of restricting the movement of the energy storage devices 200 by fixation to the outer case lid 120. The configuration of the busbar frame 300 will be described in detail later.

The busbar 400 is a flat-plate-like member that is disposed above the plurality of energy storage devices 200 and connected (joined) to the electrode terminals 220 of the plurality of energy storage devices 200. Thus, the busbar 400 connects the electrode terminals 220 of the plurality of energy storage devices 200 to each other. The busbar 400 connects the electrode terminals 220 of the energy storage devices 200 positioned at the ends of the plurality of energy storage devices 200 to the positive external terminal 121 and the negative external terminal 122.

The busbar 400 is formed of a metal such as aluminum, an aluminum alloy, copper, a copper alloy, or nickel, a combination thereof, or a conductive member other than the metal. In the present embodiment, the busbars 400 connect the positive terminal and the negative terminal of the energy storage devices 200 disposed adjacently to each other to connect the four energy storage devices 200 in series. The aspect of the connection of the energy storage devices 200 is not limited to the above, and series connection and parallel connection may be combined in any manner. The configuration of the busbar 400 will be described in detail later.

The substrate 500 is a circuit board that is electrically connected to the energy storage device 200, monitors the charge state and the discharge state of the energy storage device 200, and controls the charge and discharge of the energy storage device 200. As described above, the substrate 500 is placed and fixed on the busbar frame 300. Specifically, the substrate 500 includes electric components such as a fuse, a relay, a semiconductor switch such as a field-effect transistor (FET), a shunt resistor, a thermistor, and a connector.

The substrate 500 monitors states such as the charge state and the discharge state of the energy storage device 200 by acquiring information of the voltage and the like of the energy storage device 200 through the busbar 400 or acquiring the temperature information of the energy storage device 200 through the thermistor. The substrate 500 is electrically connected to the energy storage device 200, the positive external terminal 121, and the negative external terminal 122 (that is, connected to the main current path of the energy storage device 200) through the busbar 400 to control the charge and discharge of the energy storage device 200. The substrate 500 may only monitor the state of the energy storage device 200 without controlling the charge and discharge of the energy storage device 200. The configuration of the substrate 500 will be described in detail later.

2 Description of Configuration of Busbar Frame 300, Busbar 400, and Substrate 500

Figure 3:
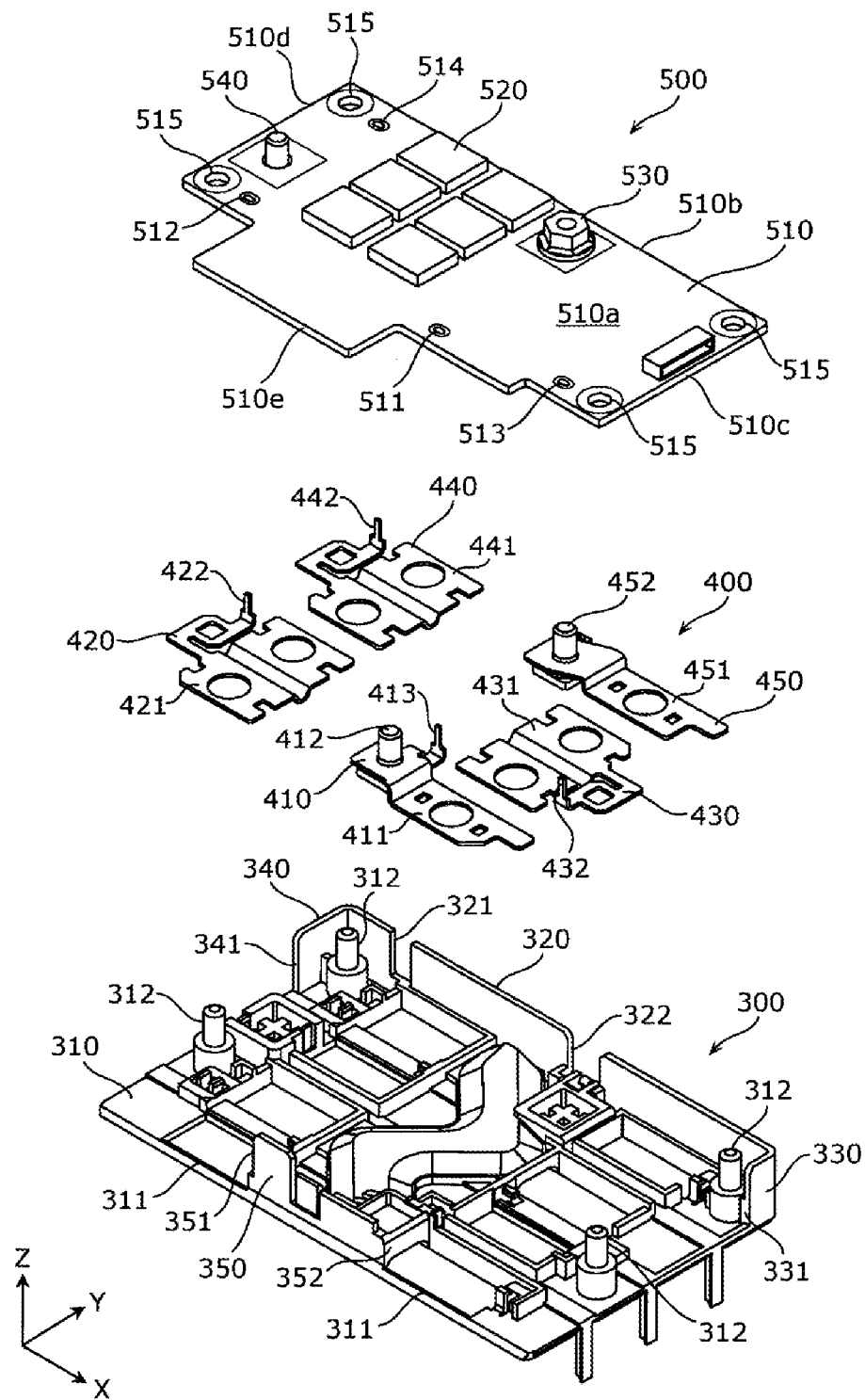
FIG. 3 is a perspective view illustrating a configuration of a busbar frame, a busbar, and a substrate according to the embodiment.

Next, the configurations of the busbar frame 300, the busbar 400, and the substrate 500 will be described in detail. FIG. 3 is a perspective view illustrating a configuration of the busbar frame 300, the busbar 400, and the substrate 500 according to the present embodiment. Specifically, FIG. 3 is an enlarged perspective view illustrating the busbar frame 300, the busbar 400, and the substrate 500 in FIG. 2 in an enlarged manner.

Figure 4:
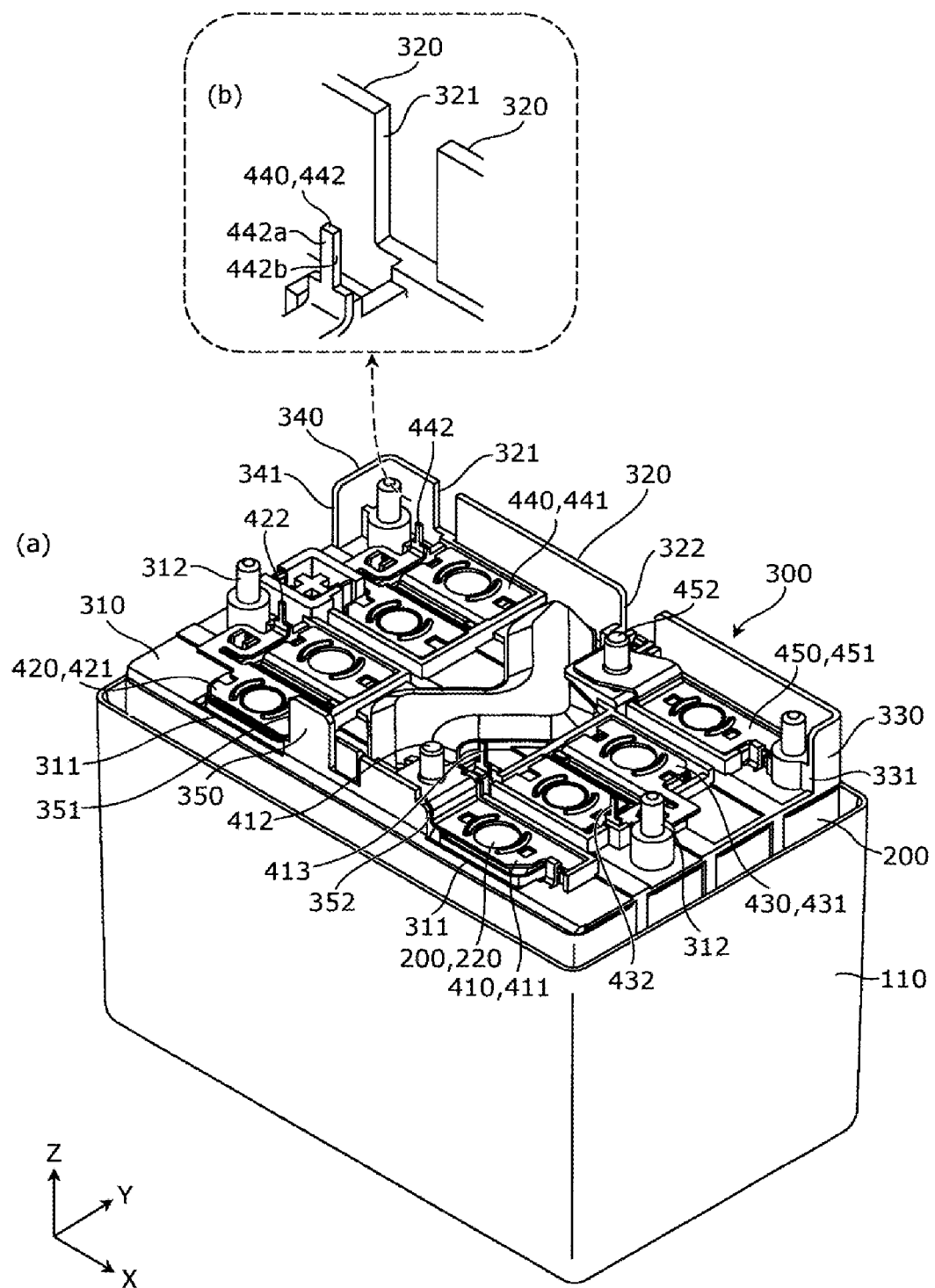
FIG. 4 is a perspective view illustrating a configuration in a state where the busbar mounted on the busbar frame according to the embodiment is joined to the energy storage device.

FIG. 4 is a perspective view illustrating a configuration in a state where the busbar 400 mounted on the busbar frame 300 according to the present embodiment is joined to the energy storage devices 200. Specifically, FIG. 4(a) is a perspective view illustrating a configuration in a state where the outer case body 110, the energy storage devices 200, the busbar frame 300, and the busbar 400 illustrated in FIG. 2 have been assembled to each other, that is, in a state where the outer case lid 120 and the substrate 500 have been removed from the energy storage apparatus 10 illustrated in FIG. 1. FIG. 4(b) is an enlarged perspective view illustrating a protrusion 442 of a busbar 440 and an opening 321 formed in a wall 320 of the busbar frame 300 in FIG. 4(a) in an enlarged manner.

FIG. 5 is a perspective view illustrating a configuration in a state where the substrate 500 is fixed to the busbar frame 300 according to the present embodiment. Specifically, FIG. 5(a) is a perspective view illustrating a configuration in a state where the outer case body 110, the energy storage devices 200, the busbar frame 300, the busbar 400, and the substrate 500 illustrated in FIG. 2 have been assembled to each other, that is, in a state where the outer case lid 120 has been removed from the energy storage apparatus 10 illustrated in FIG. 1. FIG. 5(b) is an enlarged perspective view illustrating a state where the protrusion 442 of the busbar 440 in FIG. 5(a) penetrates a through hole 514 of the substrate 500 in an enlarged manner.

[2.1 Description of Configuration of Busbar Frame 300]

As illustrated in FIG. 3, the busbar frame 300 includes a frame body 310 and walls 320, 330, 340, 350. The frame body 310 is the body of the busbar frame 300 and is a flat rectangular portion on which the busbar 400 is placed and to which the substrate 500 is fixed. The frame body 310 has an opening 311 for connecting the busbar 400 to the electrode terminal 220 of the energy storage device 200, and a fixing portion 312 for fixing the substrate 500.

The opening 311 is a rectangular through hole formed in the frame body 310, and eight openings 311 are formed at positions facing the eight electrode terminals 220 of the plurality of energy storage devices 200, respectively. Thereby, as illustrated in FIG. 4, the busbar 400 (busbars 410 to 450 to be described later) can be connected (joined) to the electrode terminals 220 of the energy storage devices 200 through the openings 311.

The fixing portion 312 is a cylindrical projection projecting in the Z-axis plus direction, and is inserted into and fixed to a through hole 515 formed in a substrate body 510 of the substrate 500 to be described later. In the present embodiment, four fixing portions 312 are inserted into and fixed to four through holes 515 formed in the substrate body 510. Specifically, as illustrated in FIG. 5, the fixing portion 312 is inserted into the through hole 515 of the substrate body 510 and then fixed to the substrate body 510 by thermal caulking. Thereby, the substrate 500 is fixed to the busbar frame 300. A method of fixing the substrate 500 to the busbar frame 300 is not limited to thermal caulking, and any method such as screw fastening, an adhesive, welding, or the like may be used.

The walls 320, 330, 340, 350 are flat and rectangular sidewalls projecting (erected) in the Z-axis plus direction from the peripheral portion of the frame body 310. That is, the walls 320, 330, 340, 350 are portions disposed lateral to the substrate 500 and covering at least a part of the side surfaces of the substrate 500 when the substrate 500 is fixed to the frame body 310. The busbar frame 300 is an example of a lateral member covering the side surface of the substrate 500. The walls 320, 330, 340, 350 are provided for the purpose of guiding when the outer case lid 120 is disposed on the outer case body 110, the purpose of restricting the movement (vibration) of the energy storage devices 200 in the outer case 100 by fixation to the outer case lid 120, and some other purpose.

Specifically, the wall 320 is a sidewall of the frame body 310 on the Y-axis plus direction side and is disposed in the Y-axis plus direction of the substrate 500 to cover at least a part of a side surface 510b of the substrate 500 to be described later. That is, the openings 321, 322 are formed in the wall 320, and the side surface 510b of the substrate 500 is exposed from the openings 321, 322 (cf. FIG. 5). The openings 321, 322 are notches penetrating in the Y-axis direction formed by recessing, in the Z-axis minus direction, the end and the center of the wall 320 on the X-axis minus direction side.

The wall 330 is a sidewall of the frame body 310 on the X-axis plus direction side, provided at the end thereof on the Y-axis plus direction side, and is disposed in the X-axis plus direction of the substrate 500 to cover at least a part of a side surface 510c of the substrate 500 to be described later. That is, since the wall 330 is opened on the Y-axis minus direction side, it can be said that an opening 331 is provided on the wall 330 on the Y-axis minus direction side, and the side surface 510c of the substrate 500 is exposed from the opening 331 (cf. FIG. 5).

The wall 340 is a sidewall of the frame body 310 on the X-axis minus direction side, provided at the end thereof on the Y-axis plus direction side, and is disposed in the X-axis minus direction of the substrate 500 to cover at least a part of a side surface 510d of the substrate 500 to be described later. That is, since the wall 340 is opened on the Y-axis minus direction side, it can be said that the opening 341 is provided on the wall 340 on the Y-axis minus direction side, and the side surface 510d of the substrate 500 is exposed from the opening 341 (cf. FIG. 5).

The wall 350 is a sidewall of the frame body 310 on the Y-axis minus direction side, is provided at the center thereof in the X-axis direction, and is disposed in the Y-axis minus direction of the substrate 500 to cover at least a part of a side surface 510e of the substrate 500 to be described later. That is, since both sides of the wall 350 in the X-axis direction are opened, it can be said that openings 351, 352 are provided on both sides of the wall 350 in the X-axis direction, and the side surface 510e of the substrate 500 is exposed from the openings 351, 352 (cf. FIG. 5).

[2.2 Description of Configuration of Busbar 400]

The busbar 400 includes five busbars 410 to 450. The busbar 410 includes a busbar body 411, a connection 412, and a protrusion 413. The busbar body 411 is the body of the busbar 410 and is a flat plate-like portion connected (joined) to the electrode terminal 220 of the energy storage devices 200 (specifically, the positive terminal of the energy storage device 201) (cf. FIG. 4). The connection 412 is a cylindrical portion projecting from the busbar body 411 in the Z-axis plus direction and is connected to another busbar (not illustrated) so as to be connected to the positive external terminal 121 through another busbar. The protrusion 413 is a protrusion projecting from the busbar body 411 in the Z-axis plus direction, penetrates the through hole 511 formed in the substrate 500 to be described later (cf. FIG. 5), and is joined to the substrate 500.

The busbar 420 includes a busbar body 421 and a protrusion 422. The busbar body 421 is the body of the busbar 420 and is a flat plate-like portion connected (joined) to the electrode terminal 220 of the energy storage devices 200 (specifically, the negative terminal of the energy storage device 201 and the positive terminal of the energy storage device 202 may be used) (cf. FIG. 4). The protrusion 422 is a protrusion projecting from the busbar body 421 in the Z-axis plus direction, penetrates the through hole 512 formed in the substrate 500 to be described later (cf. FIG. 5), and is joined to the substrate 500.

The busbar 430 includes a busbar body 431 and a protrusion 432. The busbar body 431 is the body of the busbar 430 and is a flat plate-like portion that is connected (joined) to the electrode terminals 220 of the energy storage devices 200 (specifically, the negative terminal of the energy storage device 202 and the positive terminal of the energy storage device 203 may be used) (cf. FIG. 4). The protrusion 432 is a protrusion projecting from the busbar body 431 in the Z-axis plus direction, penetrates the through hole 513 formed in the substrate 500 to be described later (cf. FIG. 5), and is joined to the substrate 500.

The busbar 440 includes a busbar body 441 and a protrusion 442. The busbar body 441 is the body of the busbar 440 and is a flat plate-like portion that is connected (joined) to the electrode terminals 220 of the energy storage devices 200 (specifically, the negative terminal of the energy storage device 203 and the positive terminal of the energy storage device 204 may be used) (cf. FIG. 4). The protrusion 442 is a protrusion projecting from the busbar body 441 in the Z-axis plus direction, penetrates the through hole 514 formed in the substrate 500 to be described later (cf. FIG. 5), and is joined to the substrate 500.

The busbar 450 includes a busbar body 451 and a connection 452. The busbar body 451 is the body of the busbar 450 and is a flat plate-like portion that is connected (joined) to the electrode terminal 220 of the energy storage device 200 (specifically, the negative terminal of the energy storage device 204) (cf. FIG. 4). The connection 452 is a columnar portion projecting from the busbar body 451 in the Z-axis plus direction and is connected (fixed) to a connection member 530 of the substrate 500 to be described later to electrically connect the busbar 450 to the substrate 500 (cf. FIG. 5).

As described above, the busbar 400 (busbars 410 to 450) are sequentially connected (joined) to the electrode terminals 220 of the four energy storage devices 200 (energy storage devices 201 to 204) to connect the four energy storage devices 200 in series. As a method of connecting (joining) the busbar 400 and the electrode terminals 220 of the energy storage devices 200, any method may be used, like welding such as ultrasonic welding, laser welding, or resistance welding, or mechanical joining such as screw fastening or caulking joining. The busbars 410 to 440 of the busbar 400 has protrusions 413, 422, 432, 442 penetrating the through holes 511 to 514 of the substrate 500. Each of the busbars 410 to 440 as thus described is an example of a through member penetrating the through hole of the substrate 500.

[2.3 Description of Configuration of Substrate 500]

The substrate 500 includes the substrate body 510, an electronic component 520, and connection members 530, 540. The substrate body 510 is the body of the substrate 500 and is a rectangular flat-plate-like portion on which the electronic component 520 is mounted. In the substrate body 510, a surface (upper surface) on the Z-axis plus direction side is defined as a main surface 510a, a side surface on the Y-axis plus direction side is defined as a side surface 510b, a side surface on the X-axis plus direction side is defined as a side surface 510c, a side surface on an X-axis minus direction side is defined as a side surface 510d, and a side surface on the Y-axis minus direction side is defined as a side surface 510e. That is, the main surface 510a is a plate surface of the substrate body 510 on which the electronic component 520 is mounted, and the side surfaces 510b, 510c, 510d, 510e are end surfaces surrounding the periphery of the substrate body 510.

The through holes 511 to 514 and 515 penetrating the main surface 510a are formed in the substrate body 510. Each of the through holes 511 to 514 is an oval through hole that penetrates the substrate body 510 in the thickness direction (Z-axis direction) and is long in the X-axis direction. The through holes 511 to 514 are formed at positions corresponding to the protrusions 413, 422, 432, 442 of the busbars 410 to 440, respectively. Specifically, the through hole 511 is formed in the middle in the X-axis direction of the end of the substrate body 510 on the Y-axis minus direction side. The through hole 512 is formed at the end of the substrate body 510 on the Y-axis minus direction side and the X-axis minus direction side. The through hole 513 is formed at the end of the substrate body 510 on the Y-axis minus direction side and the X-axis plus direction side. The through hole 514 is formed at the end of the substrate body 510 on the Y-axis plus direction side and the X-axis minus direction side.

As described above, the protrusions 413, 422, 432, 442 of the busbars 410 to 440 are inserted into the through holes 511 to 514, respectively (cf. FIG. 5), and joined by soldering or the like. Thereby, the busbars 410 to 440 and the substrate body 510 are electrically connected, and hence the substrate 500 can acquire information on the voltage and the like of the energy storage device 200 through the busbars 410 to 440 and the electrode terminals 220 of the energy storage device 200. A configuration in which the protrusions of the busbars 410 to 440 are joined to the substrate 500 will be described in detail later.

The through holes 515 are circular through holes formed at four corners of both ends in the X-axis direction and both ends in the Y-axis direction of the substrate body 510 and penetrating the substrate body 510 in a thickness direction (Z-axis direction) thereof. As described above, the cylindrical fixing portion 312 provided in the frame body 310 of the busbar frame 300 is inserted into the through hole 515. That is, four through holes 515 are formed at positions corresponding to the four fixing portions 312, and the four fixing portions 312 are inserted into and joined to the four through holes 515, respectively (cf. FIG. 5).

The electronic component 520 is a circuit component mounted on the substrate body 510 and is a fuse, a relay, a semiconductor switch such as a field-effect transistor (FET), a shunt resistor, a thermistor, or the like. The connection member 530 is a member to which the connection 452 of the busbar 450 is inserted and connected (fixed). That is, as described above, the connection member 530 fixes the busbar 450 to the substrate body 510 to electrically connect the substrate body 510 and the busbar 450 (cf. FIG. 5). The connection member 540 is a portion connected to the negative external terminal 122 via another busbar (not illustrated). That is, the connection member 540 fixes another busbar to the substrate body 510 to electrically connect the substrate body 510 and the negative external terminal 122. The connection member 530 and the connection member 540 are electrically connected via the electronic component 520 and the like, whereby the busbar 450 and the negative external terminal 122 are electrically connected.

[2.4 Description of Configuration in which Protrusion of Busbar 400 is Joined to Substrate 500]

Next, a configuration in which the protrusions (protrusions 413, 422, 432, 442) of the busbar 400 (busbars 410 to 440) are joined to the substrate 500 will be described in detail. Since any of the protrusions has the same configuration to be joined to the substrate 500, a configuration in which the protrusion 442 of the busbar 440 is joined to the substrate 500 will be described below, and description of other configurations will be omitted.

Figure 6:
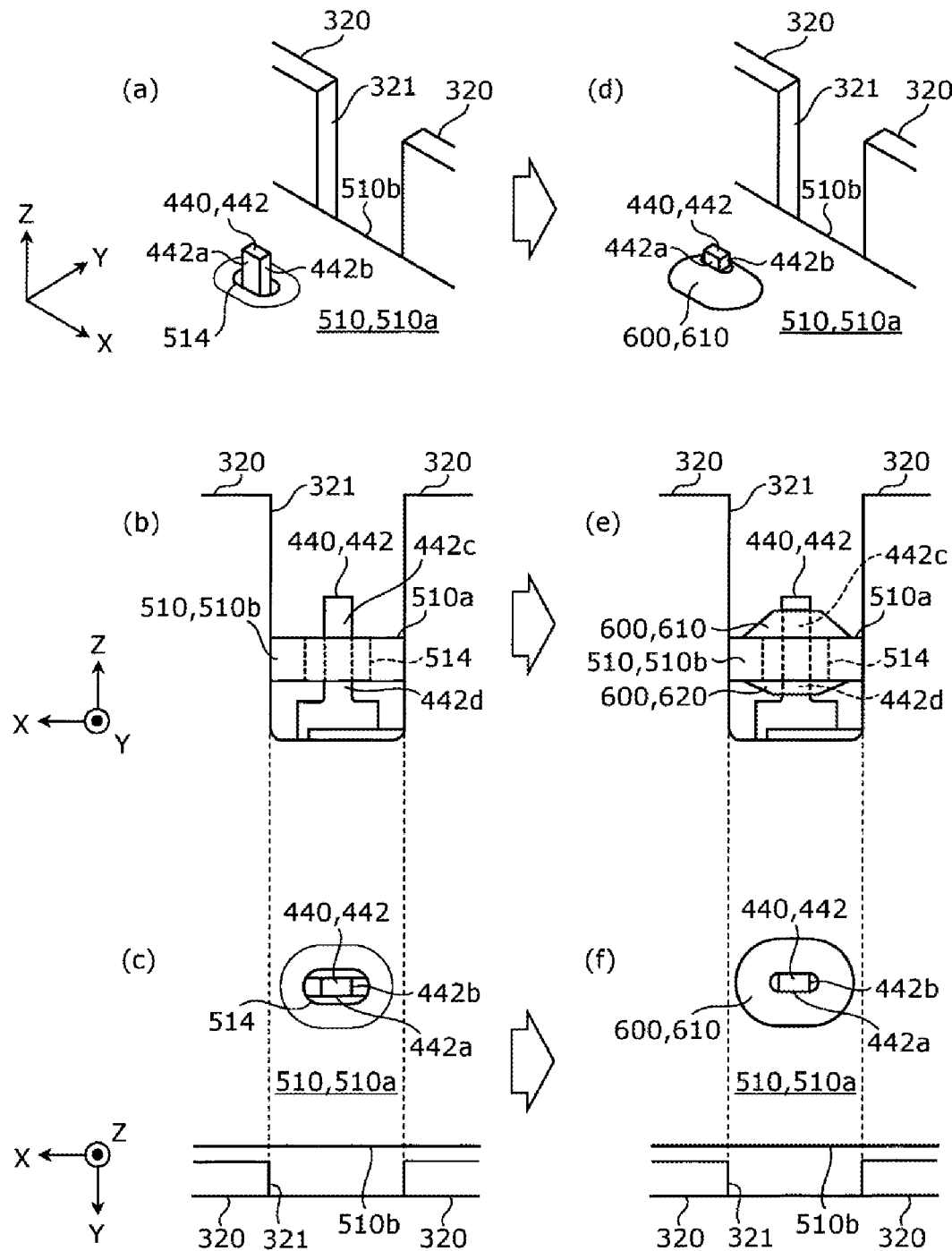
FIG. 6 is a perspective view, a side view, and a top view illustrating a state where the protrusion of the busbar according to the embodiment is joined to the substrate body of the substrate.

FIG. 6 is a perspective view, a side view, and a top view illustrating a state where the protrusion 442 of the busbar 440 according to the present embodiment is joined to the substrate body 510 of substrate 500. Specifically, FIG. 6(a) is a perspective view illustrating a state before the protrusion 442 of the busbar 440 is joined to the substrate body 510 of the substrate 500, and is a view similar to FIG. 5(b). FIG. 6(b) is a side view of FIG. 6(a) as viewed from the side (Y-axis plus direction), and FIG. 6(c) is a top view of FIG. 6(a) as viewed from above (Z-axis plus direction). FIG. 6(d) is a perspective view illustrating a state after the protrusion 442 of the busbar 440 has been joined to the substrate body 510 of the substrate 500, and corresponds to FIG. 6(a). FIG. 6(e) is a side view when FIG. 6(d) is viewed from the side (Y-axis plus direction), and corresponds to FIG. 6(b). FIG.

6(f) is a top view when FIG. 6(d) is viewed from above (the Z-axis plus direction), and corresponds to FIG. 6(c).

First, as illustrated in FIG. 4(a), in a state where the busbar 440 is mounted on the busbar frame 300 and is joined to the electrode terminals 220 of the energy storage devices 200, the protrusion 442 of the busbar 440 is disposed on the Y-axis minus direction side of the openings 321 formed in the wall 320 of the busbar frame 300. Specifically, the protrusion 442 of the busbar 440 has a long side surface 442a on the side surface in the Y-axis direction and a short side surface 442b on a side surface in the X-axis direction. The opening 321 is disposed at a position facing the long side surface 442a.

As illustrated in FIG. 5(a) and FIGS. 6(a) to 6(c), when the substrate 500 is fixed to the busbar frame 300, the protrusion 442 of the busbar 440 penetrates the through hole 514 of the substrate body 510 of the substrate 500 from the Z-axis minus direction. In this state, as described above, the protrusion 442 of the busbar 440 has the long side surface 442a and the short side surface 442b on the side surfaces in directions (Y-axis direction and X-axis direction) intersecting with a direction of penetration (Z-axis direction) into the through hole 514, and the opening 321 is disposed to face the long side surface 442a. That is, as viewed in the Z-axis direction, the rectangular protrusion 442 long in the X-axis direction is inserted into the oval through hole 514 long in the X-axis direction.

As illustrated in FIGS. 6(b) and 6(c), two portions of the protrusion 442 of the busbar 440 sandwiching the through hole 514 are referred to as a protrusion tip 442c and a protrusion base end 442d. That is, the protrusion tip 442c and the protrusion base end 442d are two portions of the protrusion 442 disposed on both sides of the through hole 514 in the Z-axis direction, in other words, on both sides of the substrate body 510 of the substrate 500.

Specifically, the protrusion tip 442c is a portion of the protrusion 442 on the distal end side of the protrusion 442, which is disposed on the Z-axis plus direction side of the through hole 514. That is, the protrusion tip 442c is a portion projecting from the main surface 510a of the substrate body 510 in the Z-axis plus direction (the outside of the substrate 500). The protrusion base end 442d is a portion of the protrusion 442 on the base end side of the protrusion 442 disposed on the Z-axis minus direction side of the through hole 514. That is, the protrusion base end 442d is a portion disposed in the Z-axis minus direction (inside the substrate 500) of the substrate body 510, in other words, a portion closer to the energy storage device 200 than the protrusion tip 442c.

The opening 321 is disposed at a position where at least one of the protrusion tip 442c and the protrusion base end 442d can be visually recognized from the outside (Y-axis plus direction). In the present embodiment, the opening 321 is disposed at a position where (the long side surface 442a of) each of the protrusion tip 442c and the protrusion base end 442d can be visually recognized from the outside. That is, the opening 321 is a notch which is deeply cut in the Z-axis direction, and not only the protrusion tip 442c but also the protrusion base end 442d (the portion closer to the energy storage device 200) is formed to be visually recognizable.

In the above configuration, as illustrated in FIGS. 6(d) to 6(f), the protrusion 442 is joined (fixed) to the substrate body 510 with solder 600. That is, the solder 600 melted from the protrusion tip 442c side (Z-axis plus direction side) is applied around the through hole 514 on the surface (main surface 510a) of the substrate body 510. Then, due to the action of gravity and surface tension, the solder 600 flows into the through hole 514, and the solder 600 is disposed and solidified around the through hole 514 on a back surface of the substrate body 510 also on the protrusion base end 442d side (Z-axis minus direction side). As a result, the protrusion tip 442c is joined (fixed) to the substrate body 510 by the solder 610, and the protrusion base end 442d is joined (fixed) to the substrate body 510 by solder 620, thus improving the joint strength of the protrusion 442 to the substrate 500. The solder 610 and the solder 620 are solder fillets having an oval frustum shape.

As thus described, the busbar 440 includes the solder 600 (solder 610 and the solder 620) in the state after the protrusion 442 has been joined to the substrate 500. In this case, the solder 610 and the solder 620 become two portions of the busbar 440 sandwiching the through hole 514, and the solder 620 becomes a portion closer to the energy storage device 200 out of the two portions.

Since the opening 321 is disposed at a position where both the protrusion tip 442c and the protrusion base end 442d are visually recognizable from the outside, the solder 610 and the solder 620 are also disposed at visually recognizable positions. That is, the opening 321 is formed such that the fillet state of the solder 610 and the solder 620 at the protrusion tip 442c and the protrusion base end 442d can be visually recognized. In this manner, the opening 321 is formed such that the joined state of the protrusion 442 to the substrate 500 can be visually recognized.

That is, in the state after the protrusion 442 has been joined to the substrate 500, the opening 321 is formed such that the protrusion tip 442c and the protrusion base end 442d, which are two portions of the busbar 440 sandwiching the through hole 514, can be visually recognized from the outside. In the state after the protrusion 442 has been joined to the substrate 500, the opening 321 is formed such that the solder 610 and the solder 620, which are two portions of the busbar 440 sandwiching the through hole 514, can be visually recognized from the outside. The opening 321 is formed such that portions of the protrusion tip 442c and the protrusion base end 442d exposed from the solder 610 and the solder 620 are also visible from the outside.

Similarly to the opening 321, the openings 331, 351, 352 are also formed such that two portions of each of the busbars 410 to 430, the two portions sandwiching each of the through hole 511 to 513, can be visually recognized from the outside. That is, the opening 331 is formed such that two portions of the busbar 410 sandwiching the through hole 511 are visually recognizable from the X-axis plus direction. Thereby, the opening 331 is formed such that the joined state of the protrusion 413 of the busbar 410 to the substrate 500 can be visually recognized. Similarly, the openings 351, 352 are formed such that two portions of each of the busbars 420, 430, the two portions sandwiching each of the through holes 512, 513, can be visually recognized from the Y-axis minus direction. Thereby, the openings 351, 352 are formed such that the joined state of the protrusions 422, 432 of the busbars 420, 430 to the substrate 500 can be visually recognized.

3 Description of Effects

As described above, the energy storage apparatus 10 according to the embodiment of the present invention includes the lateral member (the busbar frame 300 in the present embodiment) disposed lateral to the substrate 500 and covering the side surface 510b of the substrate 500. The lateral member incudes an opening 321 through which at least one of two portions, sandwiching the through hole 514, in the through member (the busbar 440 in the present embodiment) that penetrates the through hole 514 of the substrate 500 can be visually recognized from the outside. In this manner, the opening 321 is formed in the lateral member, and at least one of the two portions of the through member, the two portions sandwiching the through hole 514 of the substrate 500, is made visually recognizable from the outside. Thereby, the portion penetrating the through hole 514 of the through member can be visually recognized from the outside of the lateral member through the opening 321, so that the state of penetration of the through member into the substrate 500 can be easily grasped. When the state of penetration of the through member into the substrate 500 can be easily grasped, it is possible to prevent a defect due to attachment failure or the like of the through member to the substrate 500.

The opening 321 of the lateral member is formed such that a portion closer to the energy storage device 200 out of the two portions sandwiching the through hole 514 in the through member can be visually recognized. In the through member, a portion closer to the energy storage device 200 out of two portions sandwiching the through hole 514 is located inside the energy storage apparatus 10, and it is thus difficult to grasp a state of the through member. Accordingly, the opening 321 is formed in the lateral member such that the portion close to the energy storage device 200 can be visually recognized. As a result, the portion of the through member closer to the energy storage device 200, the portion being in a state of penetration difficult to grasp, can be visually recognized from the outside of the lateral member through the opening 321, so that the state of penetration of the through member can be easily grasped.

The through member is the busbar 440 connected to the energy storage device 200, and the opening 321 of the lateral member is formed such that the joined state of the protrusion 442, which penetrates the through hole 514 of the busbar 440 and is joined to the substrate 500 to the substrate 500, can be visually recognized. In the present embodiment, in order to measure the voltage of the energy storage device 200, the protrusion 442 is formed on the busbar 440, and the protrusion 442 is allowed to penetrate the through holes 514 of the substrate 500 and is joined (e.g., soldered) to the substrate 500. In this case, it is necessary to check whether the protrusion 442 of the busbar 440 is joined to the substrate 500 (e.g., whether a solder fillet is formed favorably). Therefore, the opening 321 is formed in the lateral member, and the joined state of the protrusion 442 to the substrate 500 can be visually recognized. As a result, the joined state of the protrusion 442 of the busbar 440 to the substrate 500 can be easily grasped, so that it is possible to prevent stress concentration on the protrusion 442 due to joint failure and to prevent the breakage of the protrusion 442.

The lateral member is the busbar frame 300 on which the busbar 440 is placed, and the busbar frame 300 includes the wall 320 that covers the side surface 510b of the substrate 500 and in which the opening 321 is formed. In the energy storage apparatus 10, the busbar frame 300 may be provided with the wall 320 that covers the side surface 510b of the substrate 500. In the present embodiment, for the purpose of preventing the movement (vibration) of the energy storage devices 200 in the outer case 100, or some other purpose, for example, the wall 320 is formed on the busbar frame 300, and the busbar frame 300 is fixed to the outer case 100 by being engaged with the outer case lid 120. The wall 320 is provided on the busbar frame 300 as a guide for disposing the outer case lid 120 on the outer case body 110. In such a case, there is a possibility that the state of penetration of the through member into the substrate 500 cannot be grasped due to the wall 320 of the busbar frame 300. Therefore, the opening 321 is formed in the wall 320 of the busbar frame 300 to make the state of penetration of the through member into the substrate 500 visually recognizable. As a result, even when the wall 320 is provided in the busbar frame 300, the state of penetration of the through member into the substrate 500 can be easily grasped.

Since the opening 321 comprises a notch formed in the lateral member, by forming the notch in the lateral member, it is possible to easily form the opening 321 through which the state of penetration of the through member into the substrate 500 can be visually recognized.

The opening 321 is disposed to face the long side surface 442a of the protrusion 442 of the through member. As described above, by disposing the opening 321 to face the long side surface 442a of the protrusion 442 instead of the short side surface 442b thereof, it is possible to visually recognize the long side surface 442a side of the protrusion 442 instead of the short side surface 442b side. This makes it easy to visually recognize the state of penetration of the through member, so that the state of penetration of the through member into the substrate 500 can be easily and more reliably grasped.

In the above description, the effect in the case where the busbar 440 is an example of the through member has been mainly described, but a similar effect is also obtained when each of the busbars 410 to 430 is an example of the through member.

4 Description of Modified Examples (First Modification)

Figure 7:
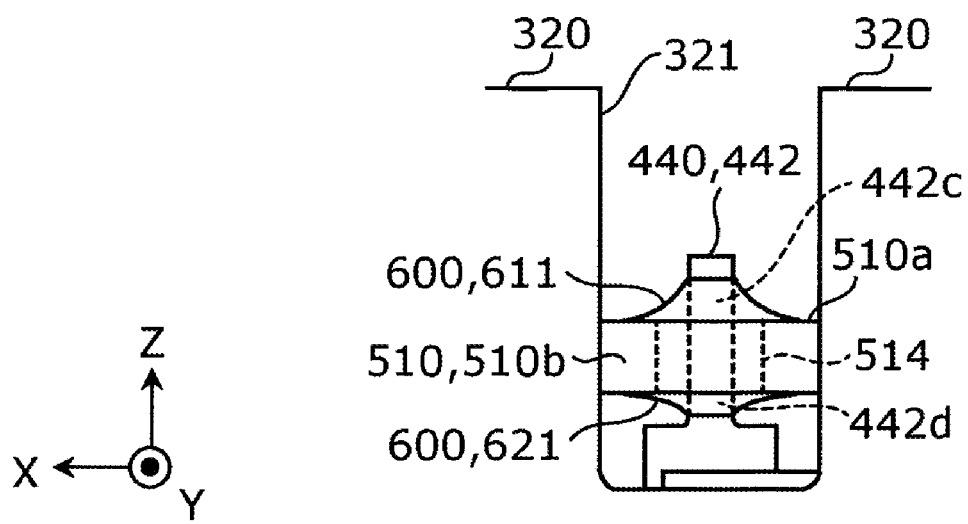
FIG. 7 is a side view illustrating a state where a protrusion of a busbar according to a first modification of the embodiment is joined to a substrate body of a substrate.

Next, a first modification of the above embodiment will be described. FIG. 7 is a side view illustrating a state where the protrusion 442 of the busbar 440 according to the first modification of the present embodiment is joined to the substrate body 510 of the substrate 500. Specifically, FIG. 7 is a diagram corresponding to FIG. 6(e).

As illustrated in FIG. 7, the busbar 440 in the present modification includes solder 611 and solder 621 instead of the solder 610 and the solder 620 in the above embodiment. The solder 611 has a shape in which the widths in the X-axis direction and the Y-axis direction sharply increase toward the Z-axis minus direction. The solder 621 has a shape in which the widths in the X-axis direction and the Y-axis direction sharply increase toward the Z-axis plus direction. Other configurations are the same as those of the above embodiment, and thus detailed description thereof is omitted.

As described above, according to the energy storage apparatus in the present modification, it is possible to achieve the same effects as in the above embodiment. That is, as described in the present modification, the shape of the solder 600 may be any shape and is not particularly limited. In general, as the shape of the solder fillet, the shape of the solder 611 and the solder 621 illustrated in the present modification is preferably used, and the effect of being able to grasp the shape by visually recognizing the shape is high.

(Second Modification)

Figure 8:
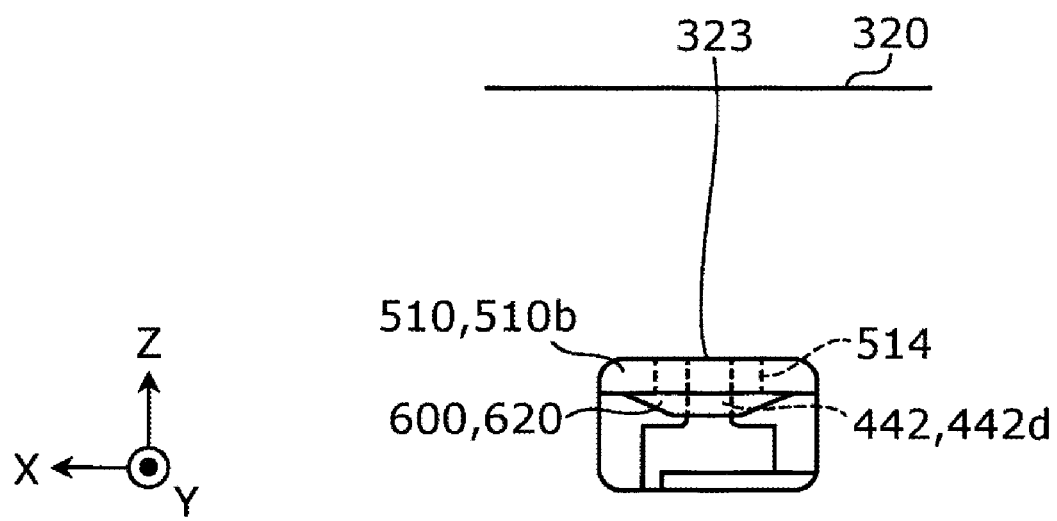
FIG. 8 is a side view illustrating a configuration of an opening formed in a wall of a busbar frame according to a second modification of the embodiment.

Next, a second modification of the above embodiment will be described. FIG. 8 is a side view illustrating a configuration of an opening 323 formed in the wall 320 of the busbar frame 300 according to the second modification of the present embodiment. Specifically, FIG. 8 is a diagram corresponding to FIG. 6(e).

As illustrated in FIG. 8, in the busbar frame 300 according to the present modification, the opening 323 is formed in the wall 320 instead of the opening 321 in the above embodiment. Other configurations are the same as those of the above embodiment, and thus detailed description thereof is omitted.

The opening 323 is a rectangular through hole formed in the wall 320 and is disposed at a position facing the protrusion base end 442d of the protrusion 442 of the busbar 440 and the solder 620. Hence the opening 323 is formed such that the state of the fillet of the solder 620 in the protrusion base end 442d can be visually recognized. That is, the opening 323 is formed such that a portion closer to the energy storage device 200 out of two portions of the busbar 440 sandwiching the through hole 514 can be visually recognized from the outside.

As described above, according to the energy storage apparatus in the present modification, it is possible to achieve the same effects as in the above embodiment. In particular, since the opening 323 is a through hole formed in the lateral member (busbar frame 300), by forming the through hole in the lateral member, it is possible to easily form the opening 323 through which the state of penetration of the through member (busbar 440) into the substrate 500 can be visually recognized. As described above, the solder 620 flows from the protrusion tip 442c side to the protrusion base end 442d side and is solidified at the time of application, and it is thus important to visually recognize the state of the fillet of the solder 620 on the protrusion base end 442d side so as to confirm whether the fillet of the solder 620 is formed favorably. Therefore, since the opening 323 is formed such that the state of the fillet of the solder 620 on the protrusion base end 442d side can be visually recognized, it is possible to effectively confirm whether the fillet of the solder 620 is formed favorably.

(Other Modifications)

Although the energy storage apparatus according to the present embodiment and the modifications thereof have been described above, the present invention is not limited to the above embodiment and the modifications thereof. That is, the embodiment disclosed herein and the modifications thereof are illustrative in all respects and are not restrictive, and the scope of the present invention is indicated by the claims, and includes all changes within the meaning and scope equivalent to the claims.

In the above embodiment and the modifications thereof, the busbar 400 (busbars 410 to 440) has been an example of the through member, but any member may be used as the through member so long as the member penetrates the substrate 500. Examples of the through member include a terminal (connector) of a cable connected to the substrate 500, a thermistor, other electronic components, and the like.

In the above embodiment and the modifications thereof, the busbar frame 300 has been an example of the lateral member, but any member may be used as the lateral member so long as the member covers the side surface of the substrate 500. Examples of the lateral member include the sidewall of the outer case, a binding member (side plate, end plate) for binding the plurality of energy storage devices 200, a spacer, and the like.

In the above embodiment and the modifications thereof, the busbar 400 has been joined to the substrate 500 by soldering, but a method for joining the busbar 400 to the substrate 500 is not limited to soldering. The busbar 400 may be joined to the substrate 500 by welding, screw fastening, caulking, or the like. Even in this case, the joined state of the busbar 400 to the substrate 500 can be visually recognized.

In the above embodiment and the first modification, the opening 321 has been formed such that both of the two portions of the busbar 440 sandwiching the through hole 514 can be visually recognized. However, the opening 321 may be formed such that only one of the two portions can be visually recognized. In the above second modification, the opening 323 may be formed such that a portion farther from the energy storage device 200 out of the two portions of the busbar 440 sandwiching the through hole 514 can be visually recognized, or may be formed such that both of the two portions can be visually recognized. The same applies to other openings.

In the above embodiment and the modifications thereof, the opening 321 (323) has been disposed to face the long side surface 442a of the protrusion 442 of the busbar 440. However, the opening 321 (323) may be disposed to face the short side surface 442b of the protrusion 442. Openings may be disposed so as to be visually recognizable from two directions, such as an opening in which the same protrusion 442 can be visually recognized from the long side surface 442a side and an opening in which the same protrusion can be visually recognized from the short side surface 442b side. The same applies to other openings.

In the above embodiment and the modifications thereof, the protrusion 442 of the busbar 440 has been a rectangular portion in a top view having the long side surfaces 442a and the short side surfaces 442b. However, the protrusion 442 may be a portion having any shape such as a square shape, a circular shape, an elliptical shape, or an oval shape in a top view. When the protrusion 442 has an elliptical shape, an oval shape, or the like in a top view, the opening 321 (323) is preferably disposed at a position facing the long side surface. The same applies to the other busbars.

In the above embodiment and the modifications thereof, any of the busbars 410 to 440 may not have the above configuration, or any of the openings 331, 351, 352, 321 (323) may not have the above configuration.

The scope of the present invention also includes forms constructed by arbitrarily combining the components included in the above embodiment and the modifications thereof.

The present invention can be realized not only as the energy storage apparatus as thus described but also as a lateral member (busbar frame 300, etc.) having an opening such as the opening 321, and can also be realized as a lateral member, the substrate 500, and a through member (busbar 400, etc.).

INDUSTRIAL APPLICABILITY

The present invention can be applied to an energy storage apparatus including an energy storage device such as a lithium ion secondary battery.

DESCRIPTION OF REFERENCE SIGNS

10: energy storage apparatus
200, 201, 202, 203, 204: energy storage device
300: busbar frame
310: frame body
311, 321, 322, 323, 331, 341, 351, 352: opening
312: fixing portion
320, 330, 340, 350: wall
400, 410, 420, 430, 440, 450: busbar
411, 421, 431, 441, 451: busbar body
413, 422, 432, 442: protrusion
442a: long side surface 442b: short side surface
442c: protrusion tip
442d: protrusion base end
500: substrate
510: substrate body
510a: main surface
510b, 510c, 510d, 510e: side surface
511, 512, 513, 514, 515: through hole
600, 610, 611, 620, 621: solder

The invention claimed is:

1. An energy storage apparatus comprising:
    an energy storage device;
    a substrate in which a through hole penetrating a main surface is formed;
    a through member that penetrates the through hole; and
    a lateral member disposed lateral to the substrate and covering a side surface of the substrate,
    wherein the lateral member includes a wall covering the side surface of the substrate and extending along the side surface of the substrate,
    wherein the wall includes an opening through which at least one of two portions of the through member, the two portions sandwiching the through hole, is visually recognizable from an outside,
    wherein a top of the through member is at a position lower than a top of the wall in a direction perpendicular to the side surface of the substrate,
    wherein the through member is a busbar connected to the energy storage device,
    wherein the busbar includes:
        a busbar body;
        a protrusion that projects from the busbar body, penetrates the through hole, and is joined to the substrate; and
        a portion of the busbar that is disposed between the busbar body and the protrusion, and
    wherein the portion of the busbar is fixed to the lateral member.

2. The energy storage apparatus according to claim 1, wherein the opening is formed such that a portion closer to the energy storage device out of the two portions is visually recognizable.

3. The energy storage apparatus according to claim 1,
    wherein the opening is formed such that a joined state of the protrusion to the substrate is visually recognizable.

4. The energy storage apparatus according to claim 1, wherein the lateral member comprises a busbar frame on which a busbar connected to the energy storage device is mounted, and
    wherein the busbar frame includes:
        a frame body; and
        a wall that projects from the frame body and covers the side surface of the substrate, and in which the opening is formed.

5. The energy storage apparatus according to claim 1, wherein the opening comprises a notch or a through hole formed in the lateral member.

6. The energy storage apparatus according to claim 1, wherein the through member includes a long side surface and a short side surface on a side surface in directions intersecting with a direction of penetration into the through hole, and
    wherein the opening is disposed to face the long side surface of the through member.

7. The energy storage apparatus according to claim 1, wherein the wall extends in the direction perpendicular to the side surface of the substrate.

8. The energy storage apparatus according to claim 1, wherein the opening is formed in the wall as a U-shape.

9. The energy storage apparatus according to claim 1, wherein the opening extends downward from an upper surface of the lateral member.

10. The energy storage apparatus according to claim 1, wherein the opening is positioned entirely above the side surface of the substrate.

11. The energy storage apparatus according to claim 1, wherein the wall extends along:
    the side surface of the substrate; and
    a second side surface of the substrate, the second side surface being perpendicular to the side surface of the substrate.

12. The energy storage apparatus according to claim 11, wherein the wall covers only a part of the second side surface of the substrate, and
    wherein the wall extends an entirety of the side surface of the substrate.

13. The energy storage apparatus according to claim 1, wherein, when viewed in the direction perpendicular to the side surface of the substrate, the opening is open through the wall.

14. An energy storage apparatus comprising:
    an energy storage device;
    a substrate in which a through hole penetrating a main surface is formed;
    an electronic component mounted on the main surface of the substrate;
    a through member that penetrates the through hole; and
    a lateral member disposed lateral to the substrate and covering a side surface of the substrate and a side surface of the electronic component,
    wherein the lateral member includes a wall covering the side surface of the substrate and a side surface of the electronic component and extending along the side surface of the substrate,
    wherein the wall includes an opening through which at least one of two portions of the through member, the two portions sandwiching the through hole, is visually recognizable from an outside,
    wherein a top of the through member is at a position lower than a top of the wall in a direction perpendicular to the side surface of the substrate,
    wherein the through member is a busbar connected to the energy storage device,
    wherein the busbar includes:
        a busbar body;
        a protrusion that projects from the busbar body, penetrates the through hole, and is joined to the substrate; and
        a portion of the busbar that is disposed between the busbar body and the protrusion, and
    wherein the portion of the busbar is fixed to the lateral member.

15. The energy storage apparatus according to claim 14, wherein, when viewed in the direction perpendicular to the side surface of the substrate, the opening is open through the wall.

16. The energy storage apparatus according to claim 14, wherein the wall extends along:
    the side surface of the substrate; and
    a second side surface of the substrate, the second side surface being perpendicular to the side surface of the substrate.

17. The energy storage apparatus according to claim 16, wherein the wall covers only a part of the second side surface of the substrate, and
   wherein the wall extends an entirety of the side surface of the substrate.

18. An energy storage apparatus comprising:
   an energy storage device;
   a substrate in which a through hole penetrating a main surface is formed;
   a through member that penetrates the through hole;
   a solder that joins the substrate and the through member; and
   a lateral member disposed lateral to the substrate and covering a side surface of the substrate,
   wherein the lateral member includes a wall covering the side surface of the substrate and extending along the side surface of the substrate,
   wherein the wall includes an opening through which at least one of two portions of the through member, the two portions sandwiching the through hole, and the solder formed on at the least one of the two portions, is visually recognizable from an outside,
   wherein a length of the opening is formed to be at least as long as a length between one end of the solder and the other end of the solder in the direction extending along the side surface of the substrate,
   wherein a top of the through member is at a position lower than a top of the wall in a direction perpendicular to the side surface of the substrate,
   wherein the through member is a busbar connected to the energy storage device,
   wherein the busbar includes:
      a busbar body;
      a protrusion that projects from the busbar body, penetrates the through hole, and is joined to the substrate; and
      a portion of the busbar that is disposed between the busbar body and the protrusion, and
   wherein the portion of the busbar is fixed to the lateral member.

19. The energy storage apparatus according to claim 18, wherein the wall extends along:
   the side surface of the substrate; and
   a second side surface of the substrate, the second side surface being perpendicular to the side surface of the substrate.

20. The energy storage apparatus according to claim 19, wherein the wall covers only a part of the second side surface of the substrate, and
   wherein the wall extends an entirety of the side surface of the substrate.

* * * * *